United States Patent [19]
Broshi

[11] Patent Number: 6,056,983
[45] Date of Patent: May 2, 2000

[54] EDIBLE PLEASANT TASTING BUBBLE MAKING COMPOSITION

[76] Inventor: Oded Broshi, 37 Ashkenazi Street, Tel Aviv 68964, Israel

[21] Appl. No.: 09/088,621

[22] Filed: Jun. 1, 1998

Related U.S. Application Data

[60] Provisional application No. 60/048,106, May 30, 1997.

[51] Int. Cl.$^7$ ........................................................ C11D 1/84
[52] U.S. Cl. ........................ 426/104; 426/564; 252/307; 510/470
[58] Field of Search ..................................... 426/571, 564, 426/104; 252/307, 542; 510/235, 250, 470, 474; 536/119

[56] References Cited

U.S. PATENT DOCUMENTS

| | | | |
|---|---|---|---|
| 2,433,625 | 12/1947 | Raspet | 252/307 |
| 2,469,045 | 5/1949 | La Vietes | 252/307 |
| 2,893,990 | 7/1959 | Hass et al. | 260/234 |
| 2,959,887 | 11/1960 | Remeika | 46/6 |
| 2,970,962 | 2/1961 | Hass | 252/135 |
| 3,018,281 | 1/1962 | Crecelius | 260/209 |
| 3,018,282 | 1/1962 | Crecelius | 260/234 |
| 3,024,229 | 3/1962 | Hagge et al. | 260/234 |
| 3,102,114 | 8/1963 | Komori et al. | 260/234 |
| 3,231,561 | 1/1966 | Brunelle et al. | 260/234 |
| 3,248,381 | 4/1966 | Nobile et al. | 260/234 |
| 3,326,691 | 6/1967 | Moore | 99/1 |
| 3,328,307 | 6/1967 | Schmitz | 252/106 |
| 3,630,951 | 12/1971 | Netherly | 252/307 |
| 3,701,669 | 10/1972 | Van Den Hoven | 99/139 |
| 3,968,262 | 7/1976 | Hodska | 426/134 |
| 4,284,534 | 8/1981 | Ehrlich | 252/542 |
| 4,313,765 | 2/1982 | Baird et al. | 106/197 C |
| 4,511,497 | 4/1985 | Ehrlich | 252/542 |
| 4,869,898 | 9/1989 | Gaffar et al. | 424/52 |
| 4,927,656 | 5/1990 | Ito | 426/549 |
| 5,028,412 | 7/1991 | Putt et al. | 424/48 |
| 5,037,633 | 8/1991 | Ziemkiewicz et al. | 424/49 |
| 5,039,348 | 8/1991 | Cole, Jr. et al. | 134/25.3 |
| 5,190,747 | 3/1993 | Sekiguchi et al. | 424/56 |
| 5,246,631 | 9/1993 | Halbritter | 252/700 |

*Primary Examiner*—Cynthia L. Nessler
*Attorney, Agent, or Firm*—Cowan, Liebowitz & Latman, P.C.; William H. Dippert

[57] ABSTRACT

A pleasant tasting, non-toxic, aqueous-based, bubble-making solution consists essentially of (a) a suitable surfactant(s), the taste of which can be attenuated or masked sufficiently to make the solution reasonably pleasant tasting, (b) a bubble stabilizer(s) functionally compatible with the surfactant(s), (c) one or more taste agents including a sweetener and flavor agents, and (d) stabilizing and preserving agents suitable for attenuating the formation of bacteria which would adversely affect the bubble-making characteristics of the solution.

2 Claims, No Drawings

EDIBLE PLEASANT TASTING BUBBLE MAKING COMPOSITION

This application claims priority under 35 USC 119(e) from U.S. Provisional Application No. 60/048,106, filed May 30, 1997.

FIELD OF THE INVENTION

The present invention generally relates to bubble making compositions and specifically to a non-toxic, pleasant tasting, bubble making solution suitable for use by children who frequently place the bubbles on their tongues or otherwise try to drink the solution.

BACKGROUND OF THE INVENTION

For hundreds of years children have amused themselves by blowing an air stream through a ring which has been previously dipped in a soapy solution in order to create one or more individual lighter-than-air bubbles.

It is known that the dipping of the ring in such a solution creates a thin film composed of water and surfactant molecules stretched like a membrane on the ring. When a stream of bubbles is formed and detaches from the ring, such bubbles can float in the air for a period of time, which time is a function of temperature gradient, size of bubble, etc.

A major problem, however, with the prior art bubble forming solutions is that they use as their active ingredients substances which are toxic, irritant or non-edible surfactants, such as linear alkyl benzene sulfonates (LABS). These toxic materials which are used in toys for children of early ages (from two years old and upward), often come in contact with the lips of the children who blow bubbles through the wet ring, which they often place adjacent to their lips. There is also contact with the children's facial skin, eyes and hands.

Obviously this close contact with a potentially harmful material is undesirable. Similarly, young children who do not know better are often observed chasing the bubbles which they have created and trying to catch them with their mouths.

An additional potential hazard of such bubble solutions is that very young children, when left unattended with a bottle containing a liquid, are often inclined to try to drink such a liquid, if only out of childish curiosity.

Furthermore, the soapy materials used for bubble-forming solutions are irritants, which often get in the eyes of the children using such solutions.

It has, therefore, become apparent that there exists a need for an improved formulation for a bubble solution for use by small children. It is imperative that such a formulation be in accordance with the food regulations of the U.S. (F.D.A. regulations for permitted materials in the food industry) and of other countries, otherwise it would not be possible to put such a product on the market as an edible bubble solution.

OBJECTS OF THE INVENTION

It is an object of the present invention to provide for a bubble making solution which can be safely employed in toys for use by small children to produce large durable bubbles.

It is also an object of the present invention to provide for a bubble solution which can be safely employed in toys for use by small children which is non-toxic.

It is a further object of the present invention to provide for a bubble solution which can be safely employed in toys for use by small children and others which solution is non-irritant to the user.

It is a still further object of the present invention to provide for a bubble solution which can be safely employed in toys for use by small children and others which is edible.

It is yet another object of the present invention to provide for a bubble solution which can be safely employed in toys for use by small children and others that is edible and sweet-tasting and that can be classified as a confectionery product.

It is a still further object of the present invention to provide a bubble making solution which can be employed in a large variety of bubble making devices such as bubble pipes and bubble-blowing rings.

It is a yet further object of the present invention to provide a bubble making solution having the above characteristics which is both time and temperature stable.

These and other objects of the present invention will become more apparent from the discussion below.

SUMMARY OF THE INVENTION

A pleasant tasting, non-toxic, aqueous-based, bubble-making solution consists essentially of (a) a suitable surfactant(s), the taste of which can be attenuated or masked sufficiently to make the solution reasonably pleasant tasting, (b) a bubble stabilizer(s) functionally compatible with the surfactant(s), (c) one or more taste agents including a sweetener and flavor agents, and (d) stabilizing and preserving agents suitable for attenuating the formation of bacteria which would adversely affect the bubble-making characteristics of the solution.

DETAILED DESCRIPTION OF THE INVENTION

As will be realized, the size and the duration of a bubble formed will be determined by the amount of surfactant incorporated into the solution and the relationship thereof with the other ingredients. Thus, greater amounts of surfactant will result in larger, longer lasting bubbles. On the other hand, the amount of surfactant used should be limited because of the bitter taste of the surfactant, and also to comply with health authority regulations in various countries.

In a preferred embodiment of the invention the surfactant for use in the edible bubble solution will be one or more edible surfactants. Such surfactants can, for example, be selected from the group consisting of sucrose esters of fatty acids such as sucrose laurate (SL) (i.e., sucrose ester of lauric acid), sucrose miristate (SM), sucrose caprate (SC) and sucrose coprylate (SCLT). Not all sucrose esters of fatty acids contain the right qualities for producing bubbles. For example, sucrose stearate, although neutral in flavor, cannot create bubbles.

It has been found that the above edible surfactants provide the characteristics of taste which can be enhanced by sweetening agents, acceptable toxicity at functionally useful concentrations, and functionally suitable bubble making characteristics when employed with a functionally compatible bubble stabilizer.

The alkyl aryl sulfonates produce suitable bubbles but are excessively bitter and are toxic at the concentrations necessary to produce desirable bubble characteristics. Other bubble making surfactants such as soaps, sodium stearates and sodium oleates are irritating to the eyes, bad tasting, rancid, have a pH level of around 9 and are time and temperature unstable and incompatible with most artificial flavorings and sweetening agents.

Generally speaking, the edible surfactants can be present at an amount of from about 0.1 to 60% w/w (i.e., percent by weight based upon the total weight of the solution). The practical upper limit being (a) the percentage at which the taste of the bubble solution becomes wholly unacceptable and cannot be overcome by sweetening and flavoring or (b) the percentage which exceeds the toxicity limits.

The range for the edible surfactants SL, SC, SM, SCLT is from about 0.25 or 0.3 to 10% w/w (about 0.25 or 0.3 to 10 grams in 100 grams of distilled water). Most preferably the range should be from about 0.25 to 3% w/w. It should be mentioned, however, that in certain countries such as Japan the maximum level of sucrose esters of fatty acids (SEFA) in food allowed by the health authorities is 1% w/w. One more factor which limits the amount of SEFA in such a solution is bitterness. For example, an amount of SL higher than 0.5% w/w will be too bitter tasting and will not be masked by any strong sweetener due to the fact that the taste buds (receptors) responsible for bitterness in the mouth and on the tongue are situated in a different location than the taste buds responsible for sweetness. For this reason, the SEFA of high-foaming capacity and strong bitterness such as the SL ought to be combined with SEFA or lesser foaming capacity but with more subtle taste such as SM.

Another feature of the SEFA is that they have different eutectic points, referred to sometimes as "cloud points", that allow different SEFA to reach their best foaming capacity at different temperatures.

This factor also calls for a precise balance between different SEFA which would be able to produce bubbles in the range of between about 7 to 40 degrees celsius, which is roughly the range were children play with bubbles.

A second component of the solution is a viscosity-increasing and bubble-stabilizing agent, selected from a group of edible polymers consisting of sugars, polysaccharides, polysaccharide derivatives, proteins and glycerin. Useful polysaccharide derivatives include, for example, starch, gelatine, carboxy methyl cellulose, ethyl methyl cellulose, cream of tartar, hydroxy propyl methyl cellulose, carrageenan gum, sodium alginate, xanthan gum, guar gum, gum arabic, and locus bean gum. This agent will be present in an amount sufficiently to increase viscosity and stabilize bubbles preferably at an amount of from about 0.01 to 1% w/w.

Most preferably, the viscosity-increasing and bubble-stabilizing agent will be present at an amount of from about 0.01 to 0.5% w/w.

Optionally, a polysaccharide derivative component comprising one or more ingredients selected from the group consisting of guar gum, locust bean bum, xanthan gum, sodium alginate and gum arabic could be present at an amount of from about 0 to about 20% w/w, most preferably in an amount of from about 0.01 to about 0.5% w/w.

While the above edible surfactants are considerably less bitter tasting than commonly employed alkyl aryl benzene sulfonates, it nevertheless needs a taste-enhancing agent to make it pleasant tasting. Since the above edible surfactants are bitter in taste, the most effective way to produce a pleasant taste would be to use a sweetening agent. Among the suitable sweetening agents are naturally occurring sugars such as dextrose as well as synthetic sweeteners such as acesulfame, aspartame, cyclamic acid and its sodium and calcium salts, saccharin and its sodium and calcium salts, tautamin and neohesphidrin. The concentration of the sweetening agent is a function of the amount needed to achieve the desired level of taste. This, in turn, is a function of the concentration of the surfactant.

While in the present invention the preferred embodiment employs polysaccharides and sugars as viscosity agents and sugars and aspartame as sweetening agents, it has been found that polysaccharides, sugars and aspartame may support the development of bacteria such as pseudomonas, which, while harmless in small quantities to humans, virtually destroys the bubble-making capabilities of the composition over a short period of time. Accordingly, it is necessary to employ a preservative in quantities just sufficient to attenuate the formation of bacteria and fungi to the degree necessary. This, in turn, is a function of the preservative selected. In the preferred embodiment of the present invention, benzoic acid or potassium sorbate is employed in quantities just sufficient to achieve the desired level of attenuation of bacteria development. The levels are from about 0.6 to 1.6% w/w of benzoic acid or potassium sorbate. As an antifungi agent, the preferred material is methyl paraben.

While the invention now will be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention. It being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLES

Example 1

A 1% w/w of sucrose miristate (sucrose ester of miristatic acid) dissolved in water, followed by the addition of 0.3% hydroxypropyl methyl cellulose, 0.15% xanthan gum, 0.5% aspartame, 0.5% dextrose and 0.01% cherry concentrate. Such a solution can produce large bubbles, can be safely eaten and has a sweet taste which is defined only the aspartame, the dextrose and the cherry flavor concentrate. Alas, this solution will produce more than three or four bubbles only in temperatures higher than 30 degrees celsius.

Example 2

A 1% w/w of sucrose laurate is dissolved in water, followed by addition of 0.3% carboxy methyl cellulose, 0.15% carrageenan gum 0.5% aspartame, 0.5 % dextrose and 0.01% grape concentrate and 1% benzoic acid. Such a solution can produce more than 10 fine and large bubbles in any temperature higher than 40° celsius and can be safely eaten, but it has a bitter aftertaste which is difficult to mask by the sweetening and flavoring agents.

Example 3

A 1% w/w of sucrose caprylate is dissolved in water, followed by addition of 0.2% hydroxy propyl ethyl cellulose, 0.2% xanthan gum, 0.5% saccharin, 0.5% dextrose and 0.01% strawberry concentrate. Such a solution can produce large bubbles and can be safely eaten, but, similar to the sucrose laurate, it has a strong, bitter aftertaste which is difficult to mask.

Example 4

A 0.5% w/w of sucrose miristate, 0.4% w/w sucrose caprylate, and 0.1% w/w of sucrose laurate is dissolved in water, followed by addition of 0.15% w/w xanthan gum, 0.04% w/w carrageenan gum, 0.5% aspartame, 0.37% dextrose and 0.02% grape concentrate. Such a solution can produce a stream of large bubbles in the relevant temperature range (7–40° celsius and higher), can be safely eaten and has a sweet taste which is defined only by the aspartame, the dextrose and the cherry flavored concentrate.

What is claimed is:

1. A pleasant-tasting, non-toxic edible bubble-making composition consisting essentially of:
   (a) water;
   (b) from about 0.1 to 60 % w/w of at least one surfactant selected from the group consisting of sucrose laurate, sucrose miristate, sucrose caprate and sucrose caprylate;
   (c) from greater than 0 to about 20 % w/w of a bubble-stabilizing agent selected from the group consisting of starch, gelatine carboxy methyl cellulose, ethyl methyl cellulose, cream of tartar, hydroxy propyl methyl cellulose, carrageenan gum, sodium alginate, xanthan gum, guar gum, gum arabic, and locus bean gum;
   (d) an amount of a sweetening or flavoring agent selected from the group consisting of acesulfame, aspartame, cyclamic acid and its sodium and calcium salts, saccharin and its sodium and calcium salts, tautamin and neohesphidrin; said amount being effective to sweeten or flavor said bubble-making composition and
   (e) from about 0.6 to 1.6 % w/w of benzoic acid or potassium sorbate.

2. The composition of claim 1, wherein said composition further includes dextrose.

* * * * *

EX PARTE REEXAMINATION CERTIFICATE (4881st)

United States Patent
Broshi

(10) Number: US 6,056,983 C1
(45) Certificate Issued: Nov. 18, 2003

(54) EDIBLE PLEASANT TASTING BUBBLE MAKING COMPOSITION

(75) Inventor: Oded Broshi, 37 Ashkenazi Street, Tel Aviv 68964 (IL)

(73) Assignee: Oded Broshi, Tel Aviv (IL)

Reexamination Request:
No. 90/006,326, Jul. 16, 2002

Reexamination Certificate for:
Patent No.: 6,056,983
Issued: May 2, 2000
Appl. No.: 09/088,621
Filed: Jun. 1, 1998

Related U.S. Application Data

(60) Provisional application No. 60/048,106, filed on May 30, 1997.

(51) Int. Cl.[7] ............... A23G 3/00; C11D 1/46
(52) U.S. Cl. ............ 516/15; 426/548; 426/564; 426/658; 516/18; 516/19; 446/15; 510/470
(58) Field of Search ................ 426/104, 564, 426/548, 658; 516/18, 19; 446/15; 510/470

(56) References Cited

U.S. PATENT DOCUMENTS 2,893,990 A * 7/1959 Hass et al. .................. 536/119
4,966,779 A * 10/1990 Kirk ............................ 426/72
5,091,448 A * 2/1992 Hostettler et al. ............ 524/45
5,114,723 A * 5/1992 Stray-Gundersen .......... 426/74
5,391,359 A * 2/1995 Patel .......................... 427/180
6,008,172 A 12/1999 Broshi et al.
6,303,164 B2 10/2001 Cottone et al.

FOREIGN PATENT DOCUMENTS

JP          51-38290          3/1976

* cited by examiner

*Primary Examiner*—Nina Bhat

(57) ABSTRACT

A pleasant tasting, non-toxic, aqueous-based, bubble-making solution consists essentially of (a) a suitable surfactant(s), the taste of which can be attenuated or masked sufficiently to make the solution reasonably pleasant tasting, (b) a bubble stabilizer(s) functionally compatible with the surfactant(s), (c) one or more taste agents including a sweetener and flavor agents, and (d) stabilizing and preserving agents suitable for attenuating the formation of bacteria which would adversely affect the bubble-making characteristics of the solution.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 2, dependent on an amended claim, is determined to be patentable.

New claims 3–15 are added and determined to be patentable.

1. A pleasant-tasting, non-toxic edible bubble-making composition consisting essentially of:
   (a) water;
   [(b) from about 0.1 to 60% w/w of at least one surfactant selected from the group consisting of sucrose laurate, sucrose miristate, sucrose caprate and sucrose caprylate;]
   ([c] *b*) from greater than 0 to about 20% w/w of a bubble-stabilizing agent selected from the group consisting of starch, gelatine carboxy methyl cellulose, ethyl methyl cellulose, cream of tartar, hydroxy propyl methyl cellulose, carrageenan gum, sodium alginate, xanthan gum, guar gum, gum arabic and [locus] *locust* bean gum:
   ([d] *c*) an amount of a sweetening or flavoring agent selected from the group consisting of acesulfame, aspartame, cyclamic acid and its sodium and calcium salts, saccharin and its sodium and calcium salts, tautamin and neohesphidrin; said amount being effective to sweeten or flavor said bubble-making composition [and]*;*
   ([e] *d*) from about 0.6 to 1.6% w/w of benzoic acid or potassium sorbate*; and*
   *(e) from about 0.1 to 60% w/w of a surfactant combination of sucrose laurate, sucrose miristate and sucrose caprylate* to provide a bubble-making composition that can be safely eaten and has a pleasant taste.

*3. The composition of claim 1, wherein said surfactant combination further includes sucrose caprate.*

*4. The composition of claim 1, wherein said surfactant combination includes from about 0.25 to about 3% w/w of total surfactant.*

*5. The composition of claim 1, wherein said surfactant combination includes about 1% w/w of total surfactant.*

*6. The composition of claim 1, wherein sucrose miristate is present in said surfactant combination in an amount of about 0.5% w/w.*

*7. The composition of claim 1, wherein sucrose caprylate is present in said surfactant combination in an amount of about 0.4% w/w.*

*8. The composition of claim 1, wherein sucrose laurate is present in said surfactant combination in an amount of from about 0.1 to about 0.5% w/w.*

*9. The composition of claim 1, wherein said bubble-stabilizing agent is present in an amount of from about 0.01 to about 1% w/w.*

*10. A pleasant-tasting, non-toxic edible bubble-making composition consisting assentially of:*
   *(a) water;*
   *(b) from about 0.25 to about 3% w/w of a surfactant combination comprising sucrose laurate, sucrose miristate and sucrose caprylate;*
   *(c) from about 0.01 to about 1% w/w of a bubble-stabilizing agent selected from the group consisting of starch, gelatine carboxy methyl cellulose, ethyl methyl cellulose, cream of tartar, hydroxy propyl methyl cellulose, carrageenan gum, sodium alginate, xanthan gum, guar gum, gum arabic, and locust bean gum;*
   *(d) an amount of a sweetening or flavoring agent selected from the group consisting of acesulfame, aspartame, cyclamic acid and its sodium and calcium salts, saccharin and its sodium and calcium salts, tautamin and neohesphidrin; said amount being effective to sweeten or flavor said bubble-making composition; and*
   *(e) from about 0.6 to 1.6% w/w of benzoic acid or potassium sorbate;*
   *said composition being sufficient to provide a bubble-making composition that can be safely eaten and has a pleasant taste.*

*11. The composition of claim 11, wherein said surfactant combination further includes sucrose caprate.*

*12. The composition of claim 11, wherein said surfactant combination includes about 1% w/w of total surfactant.*

*13. The composition of claim 11, wherein sucrose miristate is present in said surfactant combination in an amount of about 0.5% w/w.*

*14. The composition of claim 11, wherein sucrose caprylate is present in said surfactant combination in an amount of about 0.4% w/w.*

*15. The composition of claim 11, wherein sucrose laurate is present in said surfactant combination in an amount of from about 0.1 to about 0.50% w/w.*

* * * * *